United States Patent [19]

Hughes et al.

[11] Patent Number: 5,065,261
[45] Date of Patent: Nov. 12, 1991

[54] METHOD AND APPARATUS FOR SYNCHRONIZING TIMING SIGNALS FOR HELICAL SCAN RECORDER

[75] Inventors: Timothy C. Hughes, Lafayette; Steven P. Georgis, Boulder, both of Colo.

[73] Assignee: Exabyte Corporation, Boulder, Colo.

[21] Appl. No.: 434,008

[22] Filed: Nov. 9, 1989

[51] Int. Cl.$^5$ .............................................. G11B 21/04
[52] U.S. Cl. .................................... 360/70; 360/72.1; 360/77.13
[58] Field of Search .................... 360/55, 64, 72.1, 70, 360/77.17

[56] References Cited

U.S. PATENT DOCUMENTS

| | | | |
|---|---|---|---|
| 4,484,236 | 11/1984 | Wilkinson | 360/64 |
| 4,665,447 | 5/1987 | Odaka | 360/77.14 |
| 4,677,504 | 6/1987 | Yamazaki et al. | 360/77.16 |
| 4,714,971 | 12/1987 | Sigiki et al. | 360/77.15 |
| 4,739,420 | 4/1988 | Odaka et al. | 360/77.14 |
| 4,835,628 | 5/1989 | Hinz et al. | 360/48 |
| 4,843,495 | 6/1989 | Georgis et al. | 360/77.15 |
| 4,845,577 | 7/1989 | Georgis et al. | 360/72.2 |

Primary Examiner—Aristotelis Psitos
Assistant Examiner—David L. Robertson
Attorney, Agent, or Firm—Griffin Branigan & Butler

[57] ABSTRACT

Method and apparatus are provided for developing a digital timing signal indicative of when a head of a helical scan recorder (30) is positioned over a recorded stripe on magnetic tape (32). The method involves rotating a drum (36) upon which a head is mounted while the magnetic tape (32) is transported past the drum at a speed greater than the nominal speed at which stripes were recorded on the tape. Given the geometry of the system and format of the tape, the head is eventually able to recognize a pattern of digital data. The timing of the recognition of the pattern of digital data is used to determine the precise time, relative to each rotation of the drum (36), that the head ceases to traverse a stripe and the precise time during each rotation of the drum that the head begins to traverse a stripe. The determination of the edges of the digital timing signal is repeated upon every rotation of the drum (36). A servo timing signal for a servo head (also mounted on the drum) is generated in ninty (90) degree phase relationship to the digital timing signal.

39 Claims, 10 Drawing Sheets

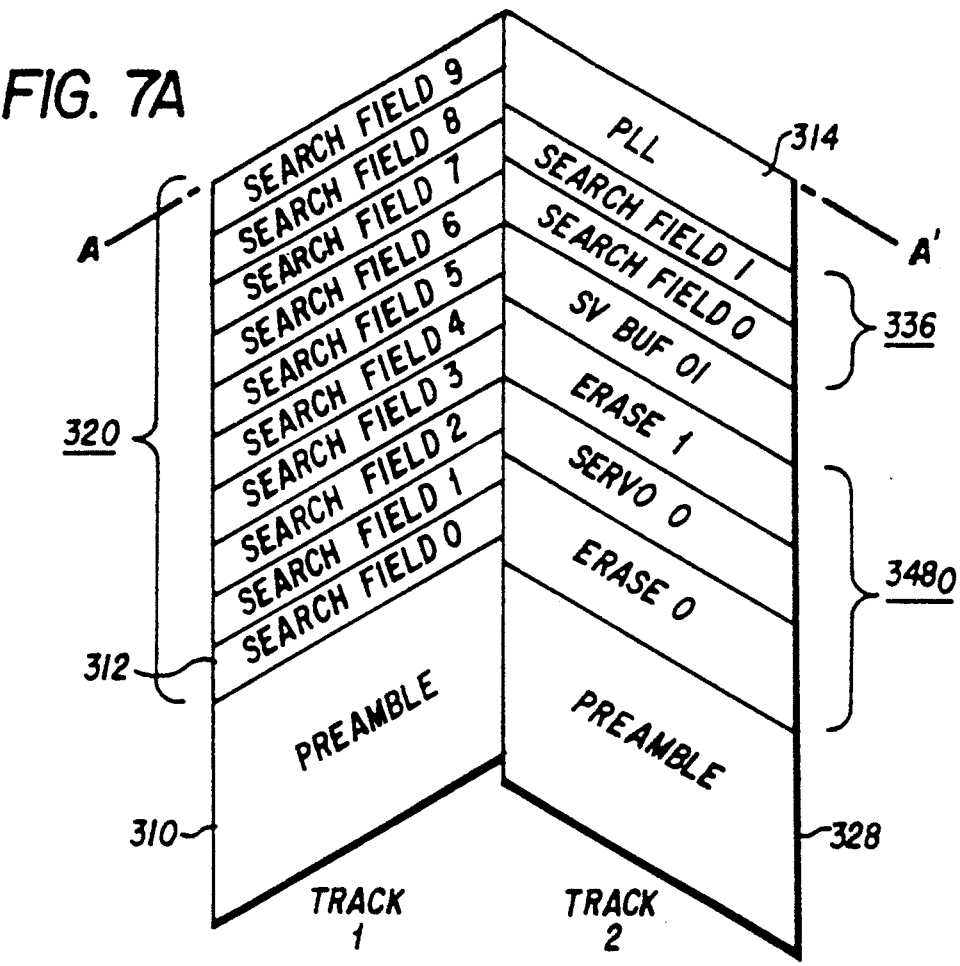

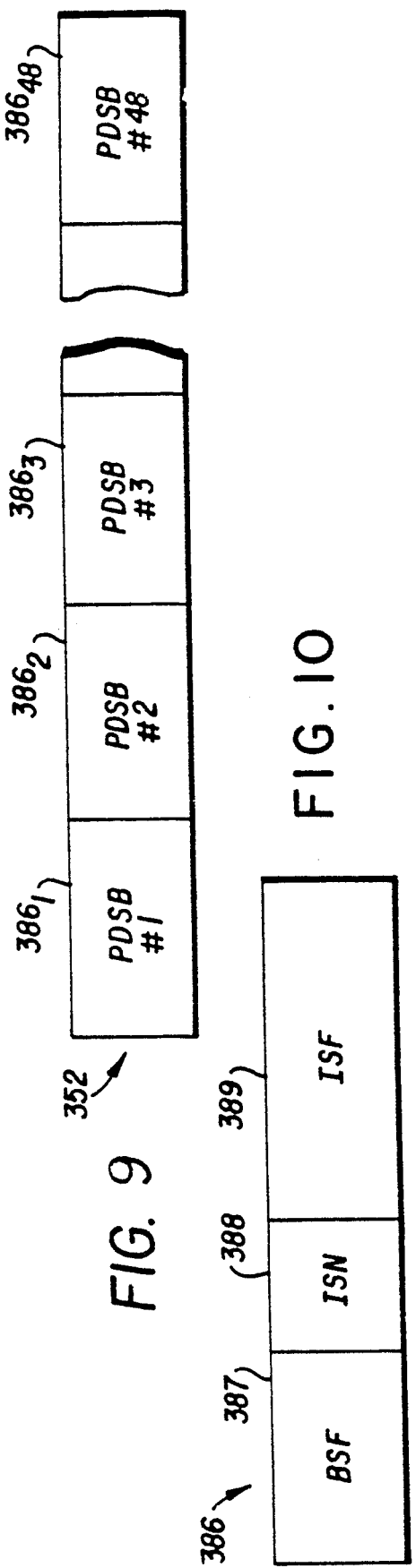

METHOD AND APPARATUS FOR SYNCHRONIZING TIMING SIGNALS FOR HELICAL SCAN RECORDER

BACKGROUND

1. Field of Invention

This invention pertains to method and apparatus for recording and reading information stored in helical stripes on magnetic tape, and particularly to method and apparatus obtaining timing signals when reading information stored in helical stripes on magnetic tape.

2. Prior Art and Other Considerations

Numerous prior art patents teach the recording and reading of information stored in helical stripes on magnetic tape. In a helical scan arrangement, travelling magnetic tape is partially wrapped around a rotating drum so that heads positioned on the drum are contiguous to the drum as the drum is rotated. A write head on the drum physically records data on the tape in a series of discrete stripes oriented at an angle with respect to the direction of tape travel. The data is formatted, prior to recording on the tape, to provide sufficient referencing information to enable later recovery during readout.

Among such prior art teachings are the following United States Patents, all commonly assigned herewith and incorporated herein by reference:

(1) U.S. Pat. No. 4,843,495 to Georgis et al., entitled CYCLICAL SERVO ZONE TRACKING METHOD AND APPARATUS FOR HELICAL SCAN RECORDING DEVICES;

(2) U.S. Pat. No. 4,835,638 to Hinz et al., entitled APPARATUS AND METHOD FOR FORMATTING AND RECORDING DIGITAL DATA ON MAGNETIC TAPE; and, (3) U.S. Pat. No. 4,845,577 to Georgis et al., entitled APPARATUS AND METHOD FOR ENABLING RAPID SEARCHING OF HELICALLY RECORDED MAGNETIC TAPE.

In reading information recorded in helical stripes on magnetic tape, it is imperative that timing signals be accurately developed. Timing signals are important for numerous functions. For example, the accuracy of the timing signals is critical for keeping the read head properly positioned over the helical stripes. Proper positioning of the read head is facilitated by servo mechanisms which read servo data on the tape. For the servo mechanisms to operate effectively, however, the servo data must be read in context of accurate timing signals.

It is an object of the present invention to provide an helical scan system which provides accurate timing signals for a helical scan recorder.

An advantage of the present invention is the provision of method and apparatus of dynamically developing timing signals for a helical scan system.

Another advantage of the present invention is the provision of helical scan method and apparatus using a simplified tape format.

SUMMARY

Method and apparatus are provided for developing a digital timing signal indicative of when a head of a helical scan recorder is positioned over a recorded stripe on magnetic tape. The method involves rotating a drum upon which a head is mounted while the magnetic tape is transported past the drum at a speed greater than the nominal speed at which stripes were recorded on the tape. The stripes of the tape are all formatted to include a plurality of data blocks. The first three hundred twenty (320) stripes of the tape are logical beginning of tape (PBOT) stripes, having data blocks which are transparent or irrelevant to the user, but which nevertheless contain a predetermined pattern of digital data.

With the tape being transported at non-nominal speed, the head is carried over the tape in skewed relationship to the recorded stripes. Nevertheless, given the geometry of the system and format of the tape, the head is eventually able to recognize at least one occurrence of the pattern of digital data. The method of the invention uses the timing of the recognition of the pattern of digital data in order to determine the precise locations of the edges of the digital timing signal. That is, the method of the invention uses the timing of the recognition of the pattern of digital data to determine the precise time, relative to each rotation of the drum, that the head ceases to traverse a stripe and the precise time during each rotation of the drum that the head begins to traverse a stripe. These precise times correspond to a first edge and a second edge, respectively, of the digital timing signal.

The duration of the digital timing signal is a fixed value dependent upon the geometry of the drum and head configuration. In the embodiment illustrated herein, a read head is positioned to traverse a stripe during exactly one-half of the rotation of the drum upon which the read head is mounted. Therefore, the duration of the digital timing signal is known to be one-half the number of clock pulses per rotation of the drum.

The format of each stripe on tape is also precisely known, including the length of the stripe from a first occurrence of the pattern of digital error correction data to the end of the stripe. Thus, once a first occurrence of the pattern of digital error correction data is detected, the first edge of the digital timing signal (e.g., the edge corresponding to the time at which the head ceases to traverse the stripe) can be determined. Then, knowing that the head will begin to traverse a stripe exactly 180 degrees of drum rotation later, the second edge of the digital timing stripe can be determined.

The steps of determining the edges of the digital timing signal are repeated upon every rotation of the drum. Moreover, a servo timing signal for a servo head (also mounted on the drum) is generated in ninty (90) degree phase relationship to the digital timing signal.

Since the pattern of digital data occurs in every block, and since a pluralty of blocks are provided on each stripe, only a first occurrence per stripe of a block is to be recognized. This is accomplished b looking for the pattern of digital data only during a window Q after a preceding digital timing signal.

For initialization purposes, the digital timing signal and various other parameters are assigned default values which are eventually replaced after the pattern of digital data is recognized.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 9 is a schematic view depicting the format of a data area including a plurality of data sub-blocks recorded by or readable by the helical scan system of the embodiment of FIG. 1.

FIG. 10 is a schematic view depicting the format of a data sub-block recorded by or readable by the helical scan system of the embodiment of FIG. 1.

DETAILED DESCRIPTION OF THE DRAWINGS

Figure 1:
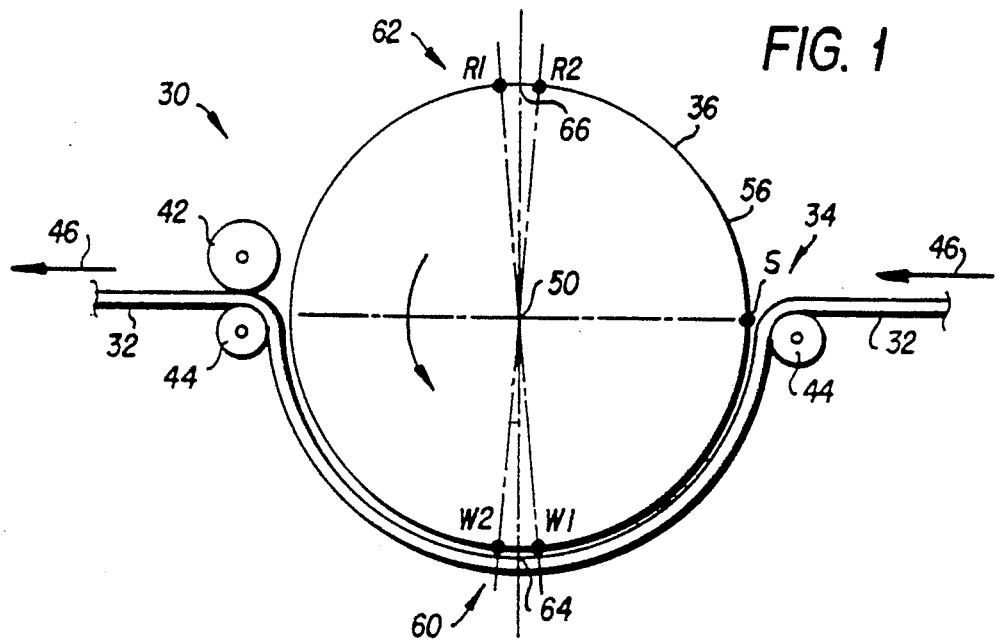
FIG. 1 is a schematic view of head placement on a drum of a helical scan system of an embodiment of the invention.

FIG. 1 shows drum and transport portions of a helical scan system 30 for recording digital information on magnetic tape 32. The helical scan system 30 includes a tape transport 34 and a rotating drum 36.

The tape transport 34 includes a capstan 42 and two tape guides 44. In conventional manner, the capstan 42 is rotated by an unillustrated capstan drive motor in order to move the tape 32 in a direction of tape travel indicated by arrows 46. In the illustrated embodiment, the capstan 42 rotates to transport the tape 32 at a speed on the order of about one-half inch per second.

DRUM AND HEAD STRUCTURE

Figure 2:
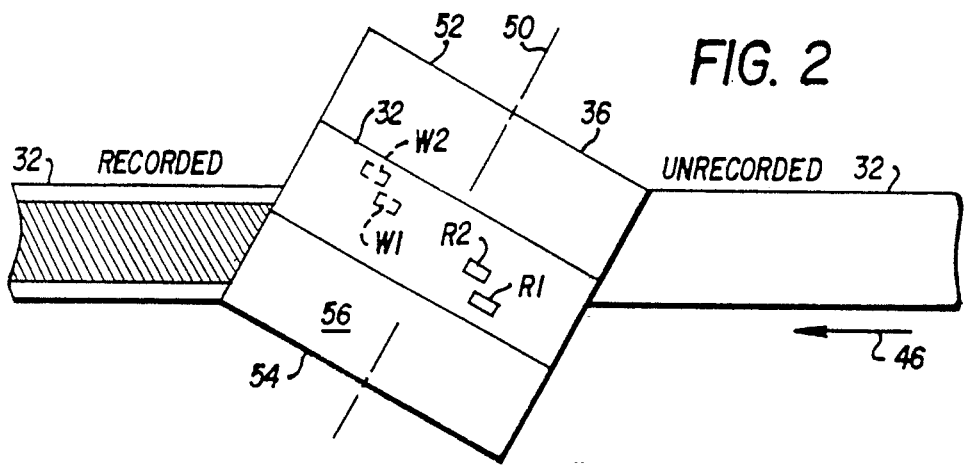
FIG. 2 is a schematic view of the helical scan system of the embodiment of FIG. 1 recording stripes on magnetic tape.

The drum 36 is rotatable about drum axis 50. The drum is rotated at a velocity of about 1800 rpm by an unillustrated drum motor. An unillustrated tachometer detects rotations of the drum motor shaft, and hence of the drum, and produces a DRUM SYNC signal. As shown in FIG. 2, drum axis 50, and hence drum 36, is angularly oriented with respect to the edges and direction of travel of the tape 32. The drum 36 has a drum upper surface 52 and a drum lower surface 54, both of which are planar. The drum axis 50 is orthogonal to both the drum upper surface 52 and the drum lower surface 54. The drum 36 also has a peripheral surface 56 which wraps around the circumference of the drum 36.

The peripheral surface 56 of the drum 36 has two sets of heads mounted thereon, in particular a first set of heads comprising write heads W1 and W2 and a second set of heads comprising read heads R1 and R2. In addition, the peripheral surface 56 of the drum 36 has a servo head S mounted thereon.

Figure 6:
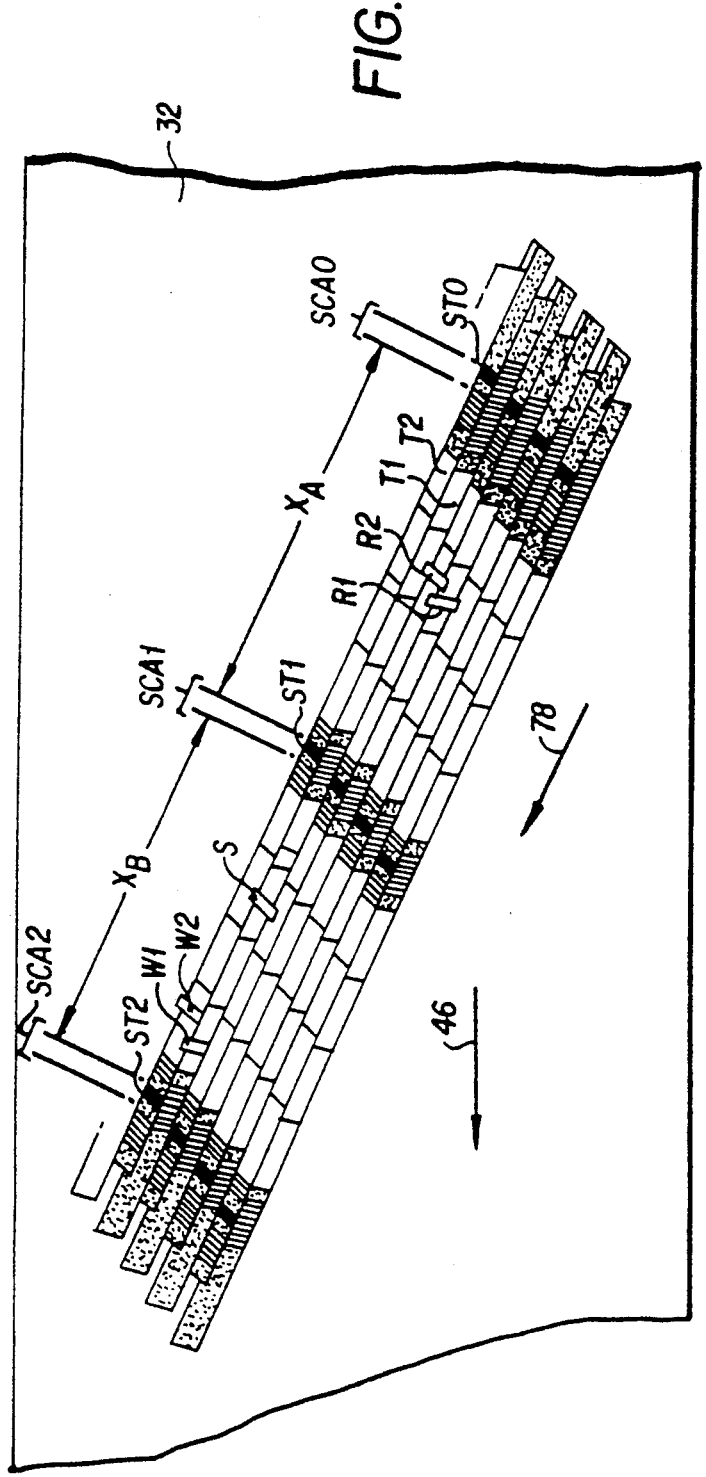
FIG. 6 is a schematic view of a plurality of stripes recorded on magnetic tape by the helical scan system of the embodiment of FIG. 1, and further showing paths of travel of heads provided on the drum of the helical scan system of the embodiment of FIG. 1.

The heads W1, W2, R1, and R2 are mounted to generate helical stripes on the magnetic tape 32 in the manner shown in FIG. 6. Heads W1 and W2 essentially simultaneously write first and second tracks of data, i.e., tracks T1 and T2, respectively, on the tape 32. Heads R1 and R2 are positioned to read tracks T1 and T2, respectively, 180 degrees after the tracks T1 and T2 are written. In this respect, although FIG. 6 shows write heads W1, W2 and read heads R1, R2 traveling over tracks T1 and T2 for the sake of depicting head placement relative to the tracks, it should be understood the read heads R1, R2 and the write heads W1, W2 cannot simultaneously be over the tracks in the manner depicted in FIG. 6. Likewise, the inclusion of the servo head S in FIG. 6 is merely to show the position of the servo head S relative to the tracks T1 and T2, and not in relationship to the read heads R1, R2 or the write heads R1, R2.

In the above regard, four geometrical factors regarding the heads are strategic to enable the simultaneous writing by heads W1 and W2 and the subsequent respective reading by corresponding heads R1 and R2; the angular separation of the heads about the drum peripheral surface 56; the axial location of the heads relative to one another; the width of the heads; and, the azimuthal orientation of the heads. These geometrical features are explained further in simultaneously-filed U.S. patent application Ser. No. 07/433961 entitled DUAL CHANNEL HELICAL SCAN RECORDER, which is incorporated herein by reference.

FIG. 6 shows a plurality of helical stripes recorded on magnetic tape 32 by the helical scan system 30, and the ultimate paths of travel of the heads W1, W2, R1, and R2, as well as the servo head S over the helical stripes. The direction of movement of the heads is depicted by arrow 78 in FIG. 6.

Thus it is seen that a dual channel helical scan system 20 is provided, with a first channel including the heads W1 and R1, and a second channel including the heads W2 and R2. The employment of two channels effectively doubles the data transfer rate, since twice as many tracks are written to tape per revolution of the drum 36. For checking purposes, the heads R1 and R2 read back the two simultaneously written tracks approximately 180 degrees after the tracks are written. The write and read functions occur exclusively, thereby eliminating any crosstalk problems.

SYSTEM STRUCTURE

Figure 4:
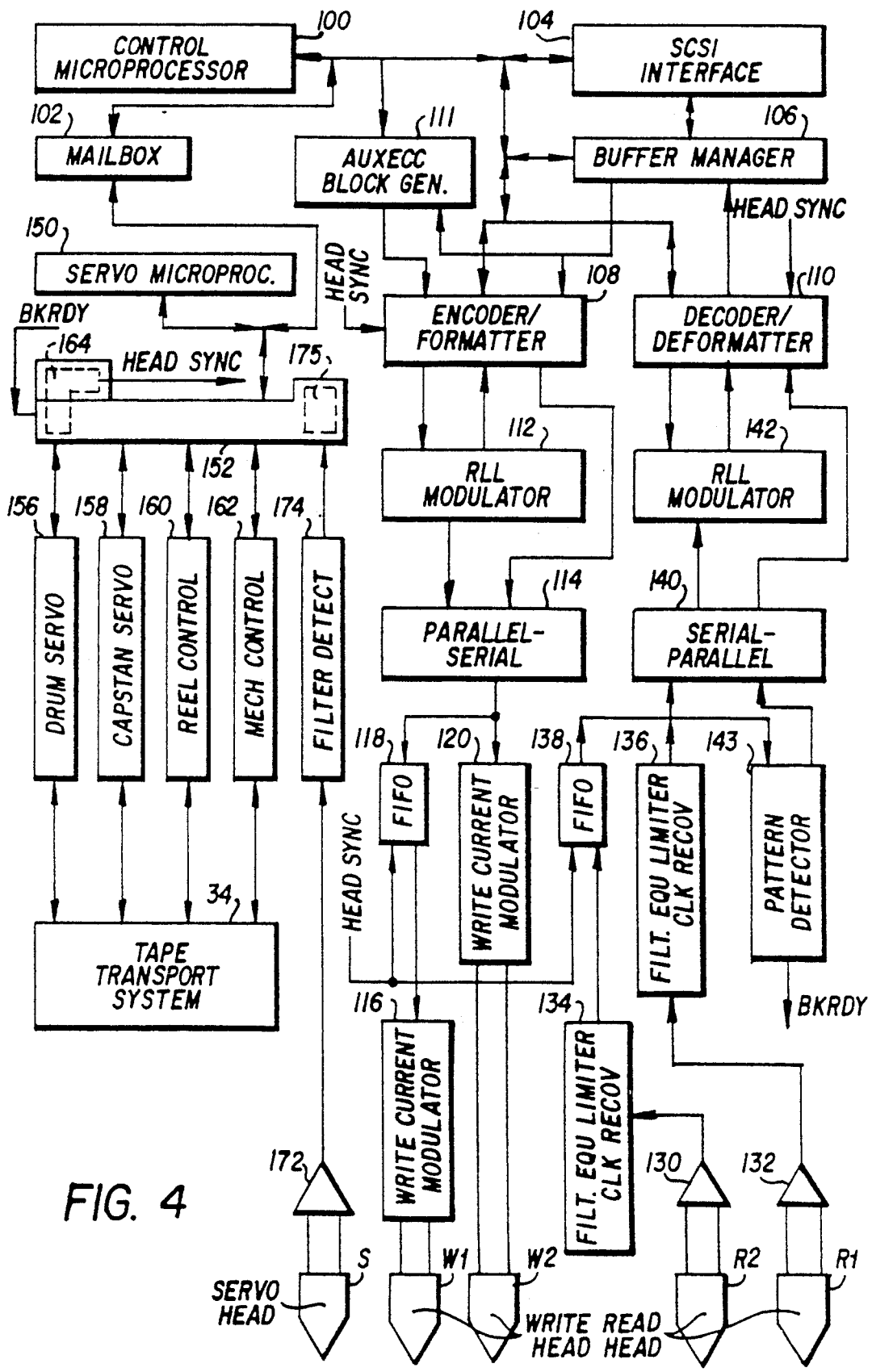
FIG. 4 is a schematic view of the helical scan system facilitating the head placement on a drum according to the embodiment of FIG. 1.

FIG. 4 illustrates the overall helical scan system 30, including the read heads R1, R2, the write heads W1, W2, and the servo head S. The helical scan system 30 further includes a control microprocessor 100 which communicates primarily with a mailbox 102; a SCSI interface 104; a data buffer manager 106; an encoder/formatter 108; a decoder/de-formatter 110; and, an AUXECC block generator 111.

The data buffer 106 manager comprises a data buffer which includes 1 MByte of DRAM is organized as a 9-bit wide, dual-port, circular memory. Data transfers between the data buffer manager 106 and the SCSI interface 104, the encoder/formatter 108, the decoder/de-formatter 110, and the AUXECC block generator 111 occur asynchronously or synchronously. Logical user data blocks are formatted into physical blocks in the data buffer 106 for recording onto tape.

The AUXECC block generator 111 produces auxiliary error correction blocks for recording error correction stripes on the tape 32. The structure and operation of the AUXECC block generator is described in simultaneously-filed U.S. patent application Ser. No. 07/434009 ERROR CORRECTION METHOD AND APPARATUS, which is incorporated herein by reference.

The encoder/formatter 108 receives data blocks from the data buffer manager 106 and from the AUXECC block generator 111. The encoder/formatter 108 performs a variety of functions, including appending error correction code (ECC) information, inserting synchronization markers, inserting search fields, and inserting servo fields and perform interleave sequencing of bytes. The encoder/formatter 108 transmits the data blocks and appended information to a RLL Modulator 112 which performs the run-length encoding of the data stream by translating each 8 bit byte to a 10-bit word. The 10-bit word is ten transmitted to a bit serializer 114. The bit serializer 114 is connected to a write driver circuit 116 (for write head W1) through a FIFO register 118, and to a write driver circuit 120 (for write head W2). The function of the FIFO register 118 will be explained below in connection with the description of the write operation of the helical scan system 30.

The read heads R2 and R1 are connected to preamplifiers 130 and 132, respectively, for amplifying a read signal. The preamplifiers 130 and 132 are connected to signal conditioning circuits 134 and 136, respectively. The signal conditioning circuits 134 and 136 include circuits for amplitude sensing, equalization, and data clocking and detection.

The signal conditioning circuit 134 is connected to FIFO register 138, which in turn is connected to a serial-to-parallel converter 140. The signal conditioning circuit 136 is connected directly to the serial-to-parallel converter 140.

The serial-to-parallel converter 140 is connected to an RLL De-Modulator 142 and to a pattern detector circuit 143. The RLL Read Modulator basically performs the inverse operations of the corresponding RLL Write Modulator 112.

The pattern detector 143 monitors the incoming stream of data in order to recognize a synchronization field. When the pattern detector 143 has recognized a predetermined number of synchronization fields having a predetermined spacing, the pattern detector 143 generates a BKRDY signal. In addition, the pattern detector 143 supplies to the serial-parallel converter 140 synchronizing signals necessary for the operation of the converter 140.

The RLL De-Modulator 142 is connected to the decoder/de-formatter 110. The decoder/de-formatter 110 assembles data blocks and performs error correction.

The microprocessor 100 communicates through its mailbox 102 with a servo microprocessor 150 and a motion control system 152. The motion control system 152 includes a dedicated microprocessor for communicating with a drum servo 156; a capstan servo 158; reel control circuits 160; and a mechanical controller 162. In addition, upon receipt of the BKRDY signal generated by the pattern detector 143, the motion control system 152 includes circuitry, herein called HEAD SYNC generator 164, for developing a HEAD SYNC signal. The HEAD SYNC signal is high when the read heads R1 and R2 are over the helical stripes of Track 1 and Track 2. The HEAD SYNC signal is low when the write heads W1 and W2 are over the stripes of Track 1 and Track 2.

The motion control system 152 also communicates with sensor interface circuits for the various unillustrated elements including the following: a drum tachometer; a capstan tachometer; a reel tachometer; an end of tape (EOT) detector; and, a beginning of tape (BOT) detector. As shown in FIG. 4, the tape transport system 34 is connected to the drum servo 156, the capstan servo 158, the reel control 160, and the mechanical controller 162.

The servo head S has its output signal connected to preamplifier 172. The output of the servo preamplifier 172 is applied to a filter and detection circuit 174 which filters the amplified signal and for detecting the servo signals recorded on tape. The filter and detection circuit 174 is in turn connected to a servo tracking circuit 175 included in the motion control system 152. The details of servo tracking circuit 175 are shown in simultaneously-filed U.S. patent application Ser. No. 07/433977 entitled SERVO TRACKING FOR HELICAL SCAN RECORDER, which is incorporated herein by reference.

TAPE FORMAT

Figure 5:
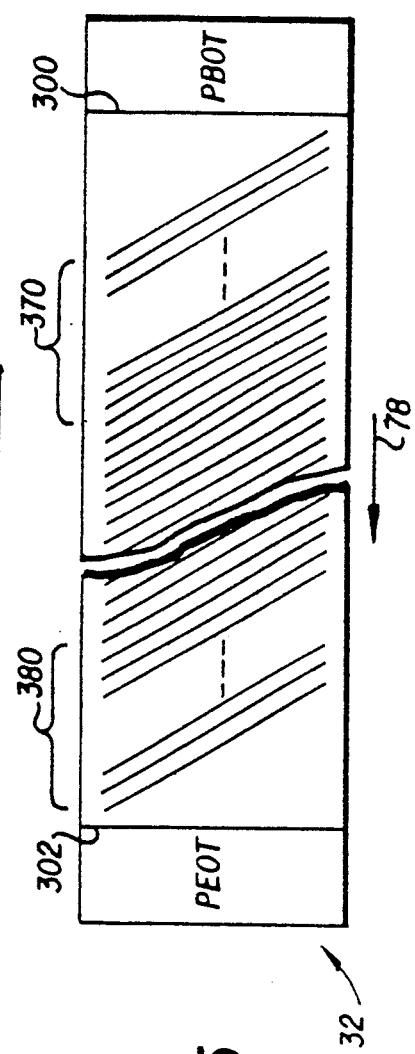
FIG. 5 is a schematic view depicting the format of a magnetic tape recorded by or readable by the helical scan system of the embodiment of FIG. 1.

FIG. 5 depicts the format of magnetic tape 32 for the helical scan system 30. The tape 32 has a physical beginning of tape (PBOT) 300 located at the point where a translucent leader material is attached to the magnetic media. Downstream from the PBOT 300 (in the sense of direction of tape transport as shown by arrow 78) are a multitude of helical stripes formed on the magnetic tape media. The helical stripes contain, of course, the information written by the write heads W1 and w2 and read by the read heads R1 and R2. The format of the helical stripes is discussed subsequently in connection with FIGS. 6 and 7. At the end of the tape 32 is a physical end of tape (PEOT) 302.

Since the helical scan system 30 is a dual azimuthal system, in a write mode odd numbered helical stripes are written at a first azimuthal angle A1 by write head W1 and even numbered helical stripes are written at a second angle A2. In a read or readback mode, odd numbered helical stripes are read at a first a1 angle A1 by write head R1 and even numbered helical stripes are read at a second angle A2. As can be discerned from the foregoing, the first angle A1 is +20 degrees; the second a1 angle A2 is −10 degrees. As used hereinafter, any helical stripe written by write head W1 or read by read head R1 is referred to as "Track 1". Likewise, any helical stripe written by write head W2 or read by read head R2 is referred to as "Track 2".

TAPE FORMAT: TRACK 1

Figure 7B:
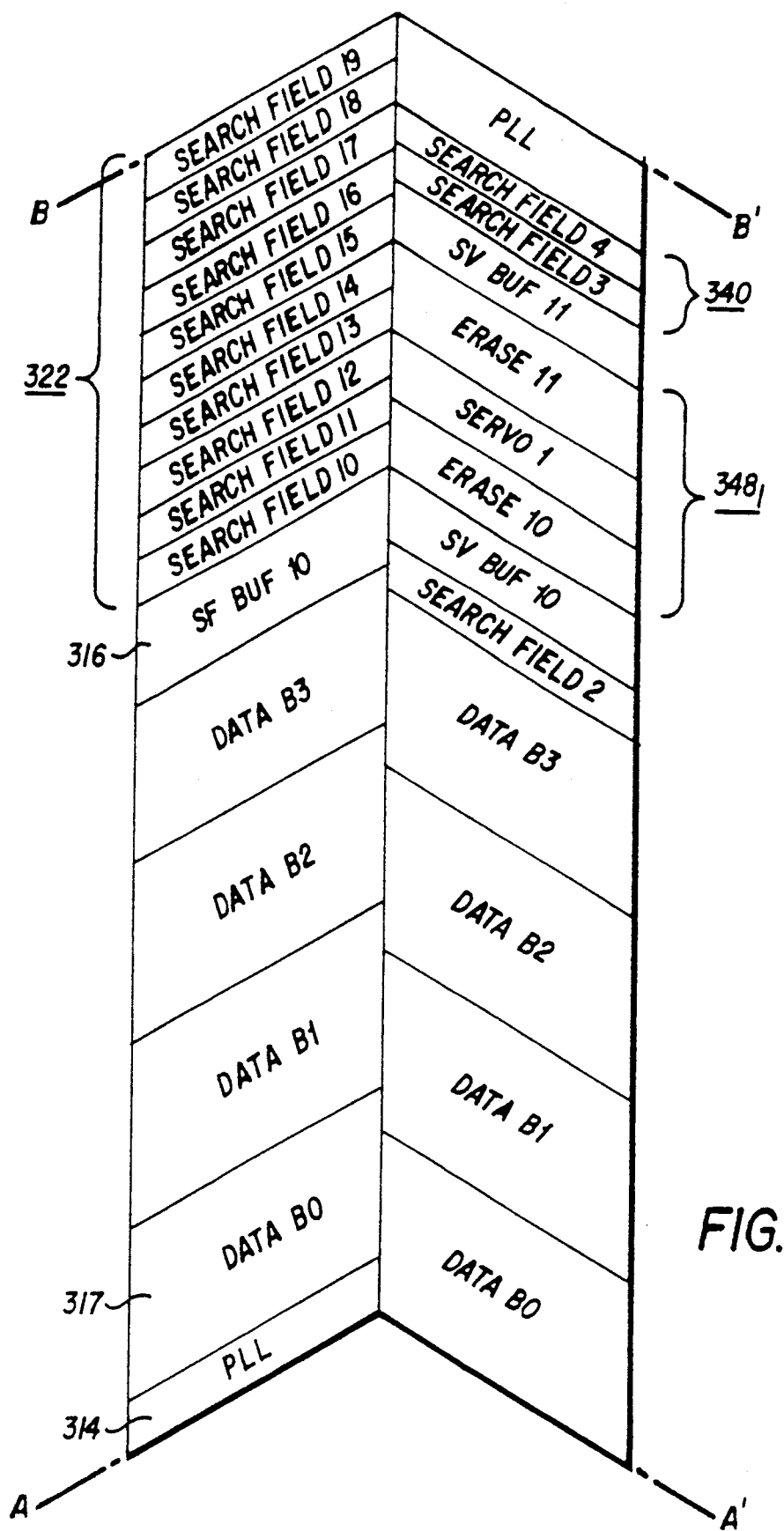
FIG. 7 is a schematic view depicting the format of Track 1 and Track 2 of a magnetic tape recorded by or readable by the helical scan system of the embodiment of FIG. 1.
Figure 7C:
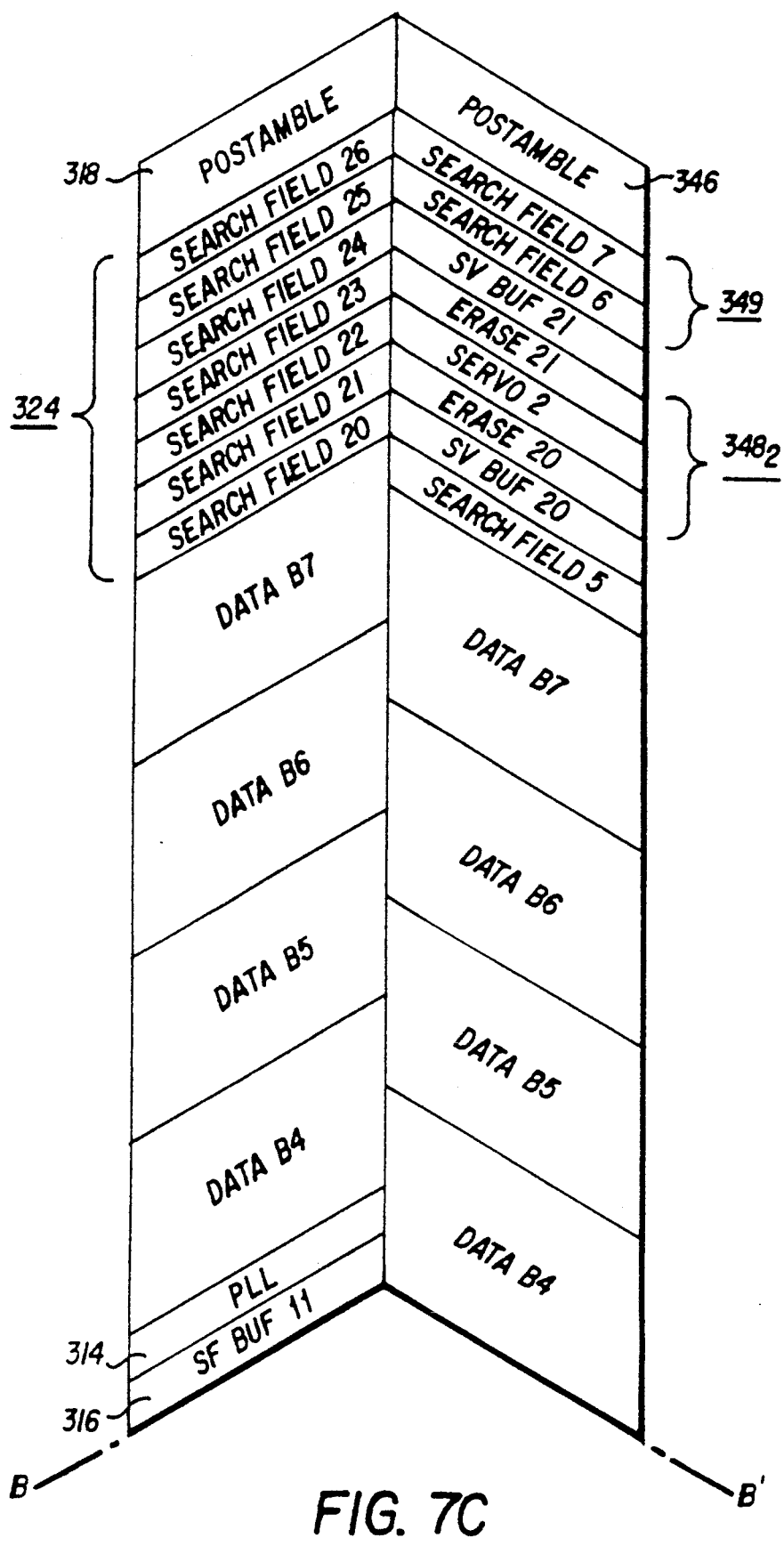

As indicated above, any helical stripe written by write head W1 or read by read head R1 is referred to as "Track 1". As shown in FIG. 7, Track 1 begins with a Preamble field 310 and further includes a plurality of search fields 312; a plurality of data phase lock loop (PLL) fields 314; a plurality of search field buffers 316; a plurality of data blocks 317; and, a postamble 318. These fields are arranged in the following order (as reflected in FIG. 7): Preamble 310 a group 320 of ten search fields (SF0-9); a first PLL field 314; four data blocks 317 (blocks B0-B3); a search field buffer 316 (SF BUF 10); a group 322 of ten search fields (SF10-19); a search field buffer 316 (SF BUF 11); a second PLL field 314; four data blocks 317 (blocks B4-B7); a group 324 of seven search fields (SF20-26); and, the postamble 318.

Both Track 1 and Track 2 contain a plurality of search fields (SF) 312 used for high speed search (HSS) of the tape. The search fields 312 are the only data on the tape 32 that are readable during high speed search.

Each search field 312 includes a sync subfield and a data subfield. The sync subfield consists of a 4.27 MHz signal, while the data subfield comprises data signals (28 bytes long). On Track 1 the search fields are organized as a series of alternating subfields. For example, in group 320, the sequence is a sync subfield for SF0; a data subfield for SF0; a sync subfield for SF1; a data subfield for SF1; a sync subfield for SF2; a data subfield for SF2; and so forth.

The search field buffers SF BUF consist of 55 consecutive digital "1"s for enabling a voltage controlled oscillator in the read circuits to lock onto data.

TAPE FORMAT: TRACK 2

Any helical stripe written by write head W2 or read by read head R2 is referred to as "Track 2". As shown in FIG. 7, Track 2 is formatted to have the following fields (in the following order): a preamble 328; a first erase field 330 ("ERASE 0"); a first servo tone area (also known as "SERVO 0" or "ST0"); a second erase field 330 ("ERASE 1"); a synchronization field known as SV BUF 01; a group 336 of search fields (SF0-1); a PLL field 314; four data blocks 317 (B0-B3); search field SF2; a synchronization field known as SF BUF 10; a third erase field ("ERASE 10"); a second servo tone area (also known as "SERVO 1" or "ST1"); a fourth erase field 330 ("ERASE 11"); a synchronization field known as SF BUF 11; a group 340 of two search fields (SF3-4); a PLL field 314; four data blocks (B4-B7); search field SF5; a synchronization field SV BUF 20; a fifth erase field 330 ("ERASE 20"); a third servo tone area (also known as "SERVO 2" or "ST3"); a sixth erase field 330 ("ERASE 21"); synchronization field SV BUF 21; a group 344 of search fields (SF6-7); and, a postamble 346.

The synchronization fields SV BUF consist of 160 consecutive digital "1"s for enabling a voltage controlled oscillator in the read circuits to lock onto data.

As with Track 1, on Track 2 the search fields are organized as a series of alternating subfields. However, in some instances the servo buffers SV BUF fulfill the function of a search field sync subfield, making the sync subfield unnecessary (as in the case of SF0 and SF3, for example).

TAPE FORMAT: SERVO FIELDS

The servo fields 348 are provided only on Track 2 and are read by the servo head S. Each servo field 348 comprises one servo data tone burst (1.42 MHz) surrounded by an erase (margin) tone (4.27 MHz). Each servo field 348 is sandwiched by a preceding and succeeding servo buffer (SV BUF), which happens to be a synchronization field. As shown in FIG. 7, servo field $348_0$ occurs near the beginning of Track 2; servo field $348_1$ occurs near the middle of Track 2; and, servo field $348_2$ occurs near the end of Track 2.

TAPE FORMAT: PHYSICAL AND LOGICAL BLOCKS

Figure 8:
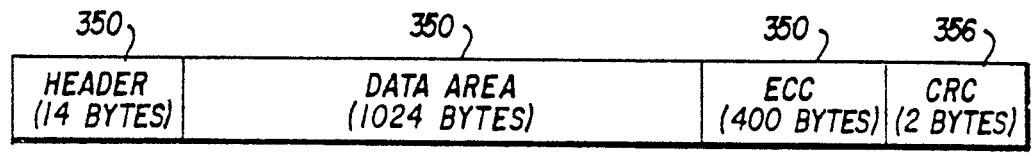
FIG. 8 is a schematic view depicting the format of a physical data block included on a stripe of magnetic tape recorded by or readable by the helical scan system of the embodiment of FIG. 1.

FIG. 8 shows the format of each of the data blocks 317. The format for the data blocks 317 is the same, regardless of whether the data block 317 is written on Track 1 or Track 2. As shown in FIG. 8, each data block 317 (also known as a "physical data block") includes a physical block header 350 (of 14 bytes); a data area 352 (of 1024 bytes); an error correction code ("ECC") area 354 (of 400 bytes); and, a cyclical redundancy check ("CRC") area 356 (of 2 bytes).

The physical block header 350 is used to determine the type of information contained in the block 317, e.g., the block type, and how the information is stored. As indicated above, the header 350 consists of 14 bytes. The four lower order bits of byte 0 of the header 350 contain a value (identifier BLOCK TYPE) which indicates the typing of the block 317. The following hexadecimal values are associated with different block types: "0H" represents user data; "AH" represents a filemark; "CH" represents a logical beginning of tape (LBOT) write with retry; "DH" represents a LBOT write with no retry; "EH" represents a gap; and, "FH" represents end of data.

As indicated above, a BLOCK TYPE value of "0H" signifies that a physical block 317 contains user data. Such a block 317 is referred to as a User Data Block. A User Data Block is a physical block which can contain up to 1024 bytes of user data in the data area 352.

The physical data blocks 317 included in the first group 370 of 320 stripes recorded on the tape 32 (shown in FIG. 5) are logical beginning of tape (LBOT) blocks. Each of these blocks have the format of FIG. 8 and include a physical block header 350, a data area 352, an ECC area 354, and a CRC area 356. The physical data blocks 317 included in the last group 380 of 128 stripes recorded on the tape 32 (shown in FIG. 5) are End of Data blocks.

TAPE FORMAT: PHYSICAL DATA SUB-BLOCKS

As shown in FIG. 9, the data area 352 of each physical block 317 is partitioned into a plurality of physical data sub-blocks $386_1$-$386_{48}$. As shown in FIG. 10, each data sub-block includes a bit synchronization field (BSF) 387; an information segment number (ISN) 388; and, an information segment field (ISF) 389.

The bit synchronization field 387 is a unique finite-length sequence or pattern which can be identified by the pattern detector 143. In the preferred embodiment, a 20 bit sequence is utilized with the sequence being 01111111111111111110. The bit synchronization field 387 provides a reference within the incoming serial bit stream of each data sub-block 386 for initiating decoding of 8/10 RLL information by the RLL De-Modulator 142.

The information segment number 387 which follows each bit synchronization field 386 is a 10-bit RLL sequence that provides a segment identifier for information in the information segment field (ISF) 389 that follows. The information segment field has 30 bytes of 10 bits of information each. There are 48 unique information segment numbers 388, which correspond to the 48 data sub-blocks 386 in each physical data block 317. The foregoing is discussed in greater detail, with examples of the values for the information segment numbers 388, in U.S. Pat. No. 4,835,628, which is incorporated herein by reference.

STRUCTURE: HEAD SYNC GENERATOR

Figure 3:
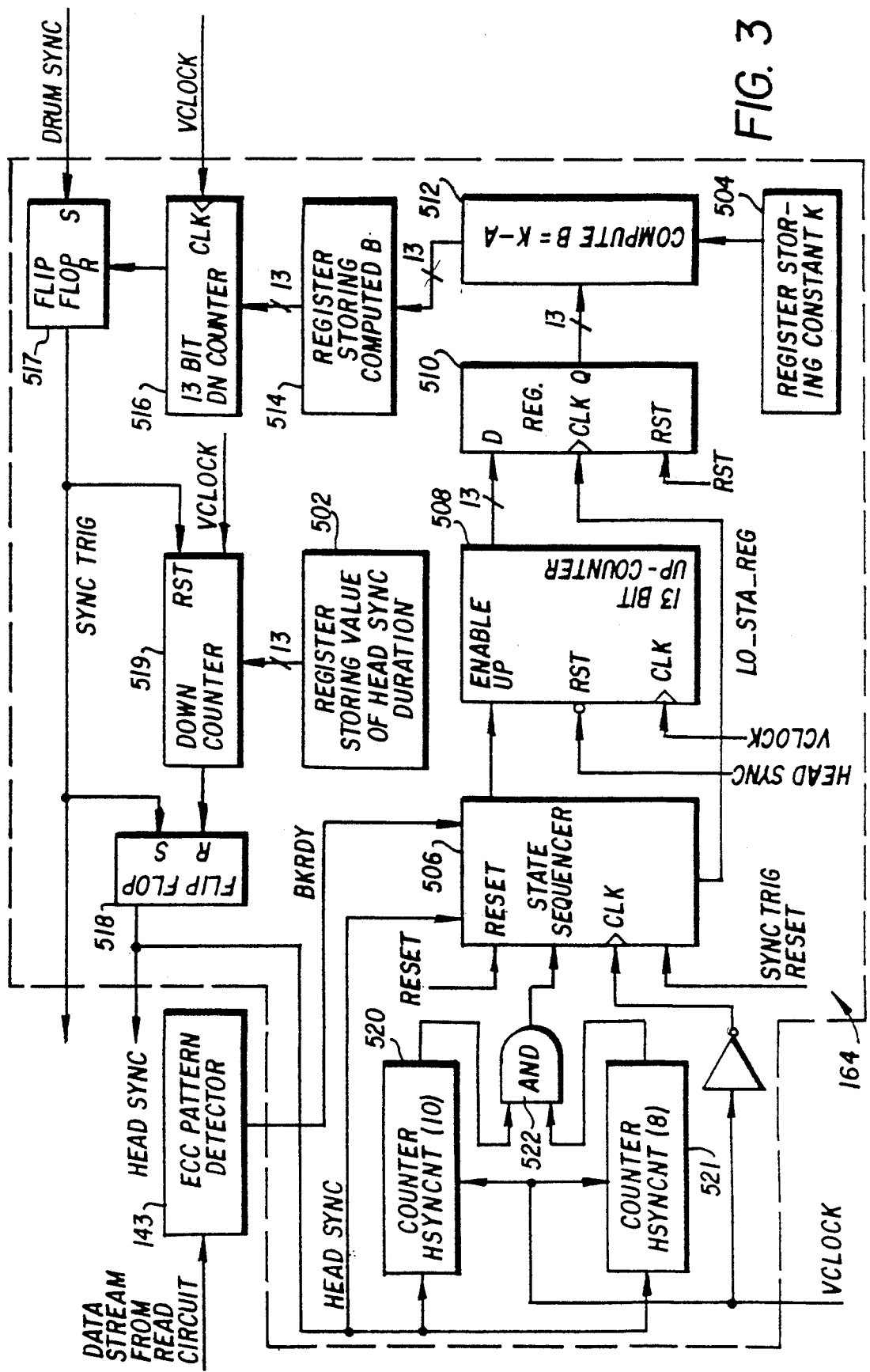
FIG. 3 is a schematic view of a HEAD SYNC generator included in the helical scan system of the embodiment of FIG 1.

The HEAD SYNC generator 164 included in the motion control system 152, together with the pattern detector 143, is shown in greater detail in FIG. 3. The HEAD SYNC generator 164 has a number of its constitutent elements connected to receive clock pulses from a system clock, as shown by inputs labeled "VCLOCK". In the illustrated embodiment, the frequency of VCLOCK is set at 375 KHz.

As explained hereinafter, the HEAD SYNC generator 164 establishes the leading edge and trailing edge of the HEAD SYNC pulse. As explained above, when HEAD SYNC is high, the read heads R1, R2 of the helical scan system 20 travel over stripes of the magnetic tape 32. When HEAD SYNC is low, the write heads W1, W2 are over the stripes.

The HEAD SYNC generator 164 has two registers, namely registers 502 and 504, which store system constant values. Register 502 stores a value equivalent to the number of clock pulses required for the drum 36 to travel through half (180 degrees) of its rotation. This value is the pulse width of the constant HEAD SYNC signal generated by the HEAD SYNC generator 164. In the illustrated embodiment, this value is 6144 clock pulses of VCLOCK. Register 504 has stored therein a value equivalent to the number of clock pulses required for a head to travel the remainder of a stripe after generation of a BKRDY signal. As will be seen hereinafter, the BKRDY signal is generated by the pattern detector 143 upon detection of a predetermined number of occurences of a synchronization field. The value stored in register 504 is thus a constant, known hereafter as the constant "K". In the illustrated embodiment, the value of constant "K" stored in register 504 is 5236 pulses of VCLOCK.

Figure 11:
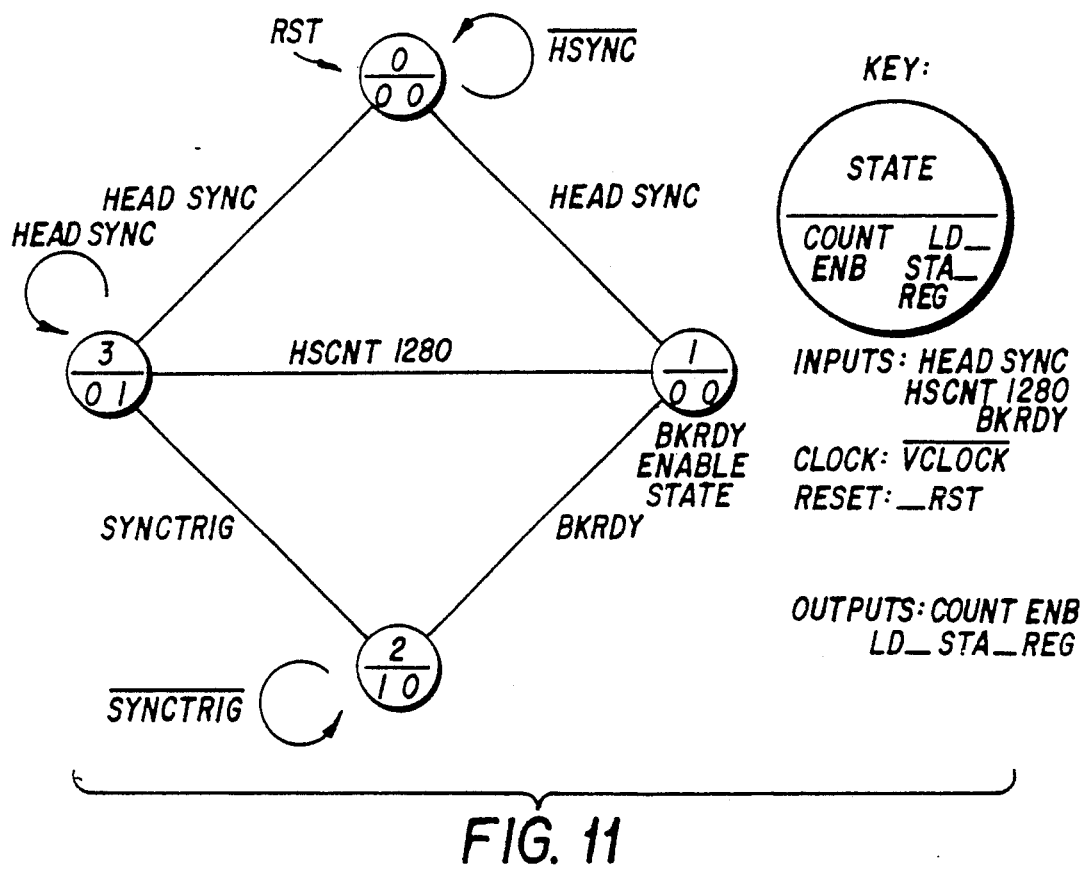
FIG. 11 is a schematic view of a state sequencer included in the helical scan system of the embodiment of FIG. 1.

The HEAD SYNC generator 164 includes a state sequencer machine 506 which is connected to receive the BKRDY signal from the pattern detector 143. The state sequencer 506 is internally configured according to the state diagram of FIG. 11.

The state sequencer 506 determines a certain interval value "A" and is connected to apply the interval value "A" to an enabling up-count pin of counter 508. The state sequencer 506 also generates a signal LO_S-TA_REG which is applied to a clock input pin of a 13-bit register 510. Data output pins of the up-counter 508 are connected to input data pins of the register 510.

Output pins of the 13-bit register 510 are connected so as to apply, upon receipt of the signal LO_STA_REG, the value "A" stored in register 510 to a computational circuit 512. The computational circuit is also connected to receive as a second input the value of register 504, previously described as containing the constant value "K". The computational circuit 512 is configured simply to take to subtract the value of "A" (as applied by the register 510) from the constant value "K", and to apply the difference "B" on a 13-bit bus to register 514.

The register 514 is connected to apply its contents (the difference "B") to a 13-bit down counter 516. The counter 516 is connected to count down from "B" to zero.

The HEAD SYNC generator 164 also comprises a flip-flop 517. Flip-flop 517 has its set terminal connected to receive the DRUM SYNC signal. As mentioned before, the DRUM SYNC signal is generated by the unillustrated tachometer mounted on the motor shaft of drum 36, so that the DRUM SYNC signal is generated once per rotation of the drum 36. Upon receiving the DRUM SYNC signal, the SYNC TRIG output signal of the flip-flop 517 goes high. The reset pin of the flip-flop 517 is connected to the down counter 516. When down counter 516 reaches zero, the flip-flop is reset so that its SYNC TRIG output signal goes low.

The SYNC TRIG signal generated by the flip-flop 517 is applied to the reset pin of a flip-flop 518. When reset, the HEAD SYNC output signal of flip-flop 518 goes low. The resetting of flip-flop 518 establishes the trailing edge of the HEAD SYNC signal.

The SYNC TRIG signal generated by the flip-flop 517 is also applied to the state sequencer 506 and to another down counter, particularly down counter 519. The down counter 519 is connected to receive the contents of register 502. Upon receipt of a low-going SYNC TRIG signal from the flip-flop 517, the down counter 519 counts down from the value contained in register 502 (i.e., 6144 pulses) to zero. Upon counting down to zero, the down counter 519 sets flip-flop 518. Setting flip-flop 518 causes the output of flip-flop 518 (i.e., the HEAD SYNC signal) to go high. Setting the flip-flop 518 thus establishes the leading edge of the HEAD SYNC signal.

The HEAD SYNC signal is applied to the state sequencer 506 as one of the inputs to the state sequencer 506. Further, the HEAD SYNC signal is applied to two counters, counters 520 and 521. Counter 520 generates a high output to AND gate 522 upon receiving $2^{10}$ (2048) VCLOCK pulses after HEAD SYNC goes high; counter 521 generates a high output to AND gate 522 upon receiving $2^8$ (512) VCLOCK pulses after HEAD SYNC goes high. The state sequencer 506 has an input pin connected to AND gate 522, which receives a true signal during a time between 512 and 2048 VCLOCK pulses after HEAD SYNC goes high.

OPERATION: HEAD SYNC GENERATION

As was mentioned above, the purpose of the HEAD SYNC generator 164 is to establish the timing of the leading and trailing edges of the HEAD SYNC signal. As will be recalled from the preceding discussion, the HEAD SYNC signal is high when the read heads R1, R2 are traveling over a stripe on tape 32. Conversely, the HEAD SYNC signal is low when the write heads W1, W2 are traveling over a stripe on tape 32. The HEAD SYNC signal is used, not only by the write and read circuits connected to the write heads W1, W2 and read heads R1, R2, but also by the formatter/encoder 108 and the decoder/deformatter 110 for properly sequencing their operations.

Figure 13:
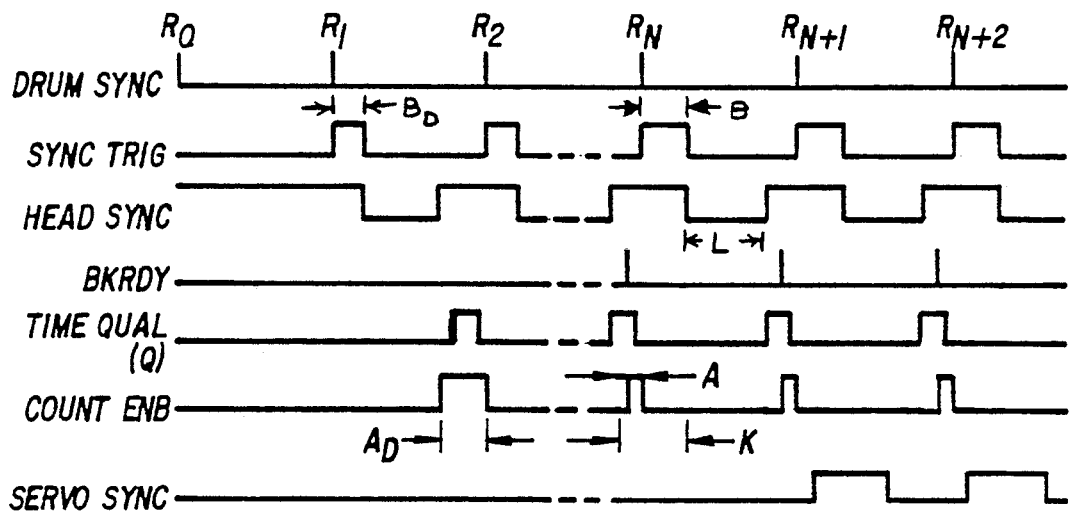
FIG. 13 is a timing diagram showing signals involved in a method of determining edges of a HEAD SYNC signal utlized by the helical scan system of the embodiment of FIG. 1.
Figure 12:
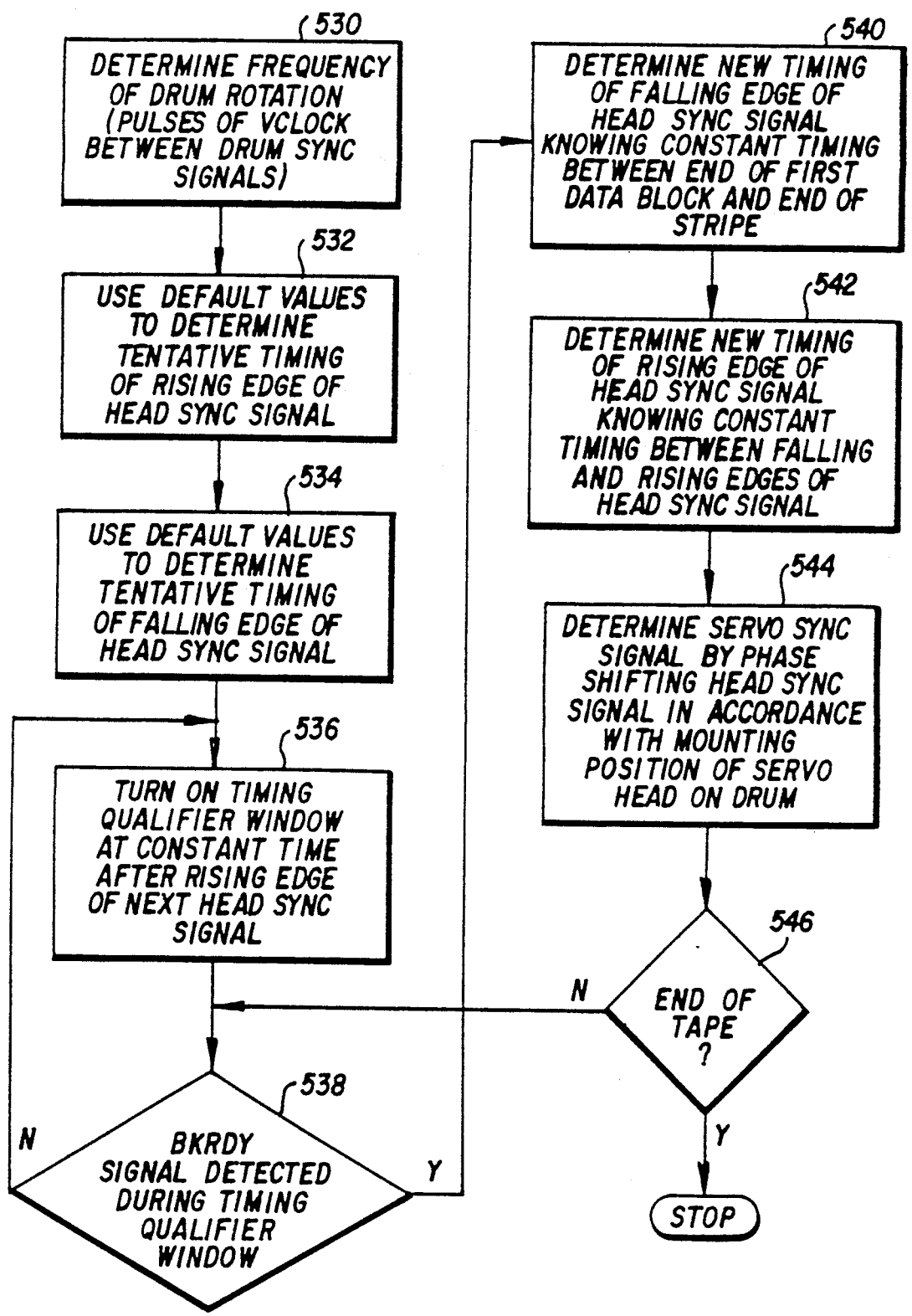
FIG. 12 is a schematic view showing steps implemented in determining edges of a HEAD SYNC signal utilized by the helical scan system of the embodiment of FIG. 1.

A method of obtaining the edges of the HEAD SYNC signal is understood with reference to FIG. 12 and FIG. 13. FIG. 12 is a logic diagram showing steps involved in the method of obtaining HEAD SYNC edges; FIG. 13 is a timing diagram showing values of pertinent signals utilized in the HEAD SYNC determination method, including the HEAD SYNC signal itself.

At the beginning of the process, the tape 32 is transported past the drum 36 and the drum 36 begins to rotate. As the drum 36 rotates, the drum tachometer generates the DRUM SYNC signal once per rotation. Assumming that the drum 36 reaches nominal rotational speed upon rotation $R_0$, a sequence of DRUM SYNC pulses $R_0$, $R_1$, $R_2$, etc. are shown in FIG. 13. Then, as shown as step 530 in FIG. 12, the number of VCLOCK pulses occuring between DRUM SYNC pulses is determined.

Upon start up, the tape 32 is transported past the drum 36 at a speed that is not the nominal transport speed for read/write operations. In the illustrated embodiment, wherein the nominal tape speed is 11.079 mm/sec, the tape is transported at a speed that is 10% greater than nominal speed.

Upon start-up, with the tape 32 being transported at a speed exceeding nominal speed, the read heads R1, R2 travel over an introductory portion of the tape 32 wherein the group 370 of LBOT stripes are stored (see FIG. 5). However, during start-up, only read head R1 is permitted to read the tape. As mentioned above, the group 370 includes 320 helical stripes. Odd numbered stripes of the group 370 were recorded by write head W1 to have the format of Track 1 as described above. Even numbered stripes of the group 370 were recorded by write head W2 to have the format of Track 2 as also described above.

Upon start up, certain default values are imposed on the HEAD SYNC generator 164 of FIG. 3. In this respect, the interval "A" is assigned a default value ($A_D$) of 2986 VCLOCK pulses by pre-loading that value into the register 510 and the value "B" is assigned a default value ($B_D$) of 2250 VCLOCK pulses by pre-loading that value into the register 514. These default values are utlized to determine a default falling edge of HEAD SYNC, as represented by step 534 in FIG. 12 and as described immediately below.

For determining the default falling or trailing edge of HEAD SYNC, upon the detection of a DRUM SYNC signal (at rotation R1) the default value $B_D$ is loaded from register 514 into the down counter 516, and the down counter 516 counts down to zero. While the down counter 516 counts down, its SYNC TRIG output signal is high. When the down counter 516 reaches a zero count, its SYNC TRIG output signal goes low.

A low-going SYNC TRIG output resets the flip-flop 518, so that the HEAD SYNC output signal of flip-flop 518 goes low, thereby establishing a default trailing edge of the HEAD SYNC signal (see step 534 of FIG. 12).

The HEAD SYNC signal stays low between rotation $R_1$ and rotation $R_2$ until the flip-flop 518 is set. In this respect, the flip-flop 518 is set exactly 6144 VCLOCK pulses later. This is the number of VCLOCK pulses "L" (loaded from register 502) down from which the counter 519 counts to zero. Upon reaching zero, the down counter 519 sets the flip-flop 518, thus establishing a default leading or rising edge of the HEAD SYNC signal.

As the read heads R1, R2 over the group 370 of LBOT stripes stored on tape 32, the super-nominal transport speed of the tape 32 precludes the heads R1, R2 from following the Track 1 and Track 2, respectively. Instead, the relative tape/drum speed causes the read heads R1 and R2 travel in a skewed manner, so that the heads R1 and R2 pass over only a fraction of the length of a track (see FIG. 14).

Both Track 1 and Track 2 stripes of the group 370 have eight physical blocks 317 provided thereon. As shown in FIG. 8, each physical block 317 has a header 350; a data area 317; an ECC area 354; and, a CRC area 356. As will be shown below, despite the super-nominal transport speed of the tape 32 and the resulting skewed orientation of the heads R1, R2 with respect to Track 1 and Track 2, respectively, read head R1 (the only read head enabled during start-up) is ultimately able to read digital information in a data area 352 of a physical block and to recognize the digital information as being in a data area. Only read head R1 is enabled during start-up, since only read head R1 is connected to the pattern detector 143 to apply signals thereto essentially in real time (as opposed to going through the FIFO 138).

Figure 14:
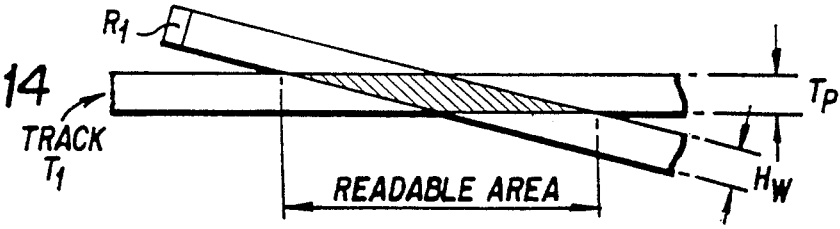
FIG. 14 is a schematic view showing a skewed orientation of a read head of the helical scan system of the embodiment of FIG. 1.

To understand how data area 352 of a physical data block 317 is recognized, consider the skewed path traveled by read head R1 in FIG. 14. The read head R1, having a width denoted by $H_W$, crosses over Track 1 (which has a pitch $T_P$). In crossing over Track 1, head R1 can read a portion of the track, the "readable area", having a length represented by a fraction having the quantity $[3T_P - H_W]$ as its numerator and the tangent of an angle difference as its demonitator. In this respect, the demonitator is the tangent of the angular difference between the angle of the head at the super-nominal transport speed and the track angle.

Given the foregoing geometry and the format of the tracks, the data area 352 of a physical data block is sufficiently short relative to the readable area determined above to be recognized. But in order to determine how the pattern detector 143 knows when an entire data area 352 has been encountered, the format of the data area 352 must be considered.

FIG. 9 shows that the data area 352 is formatted into forty-eight (48) physical data sub-blocks $386_1$–$386_{48}$. Each physical data block 386 contains the bit synchronization field 387; the information segment number 388; and, the information segment field 389. The bit synchronization field 387 is a unique finite-length sequence or pattern which can be identified by the pattern detector 143. In the preferred embodiment, a 20 bit sequence is utilized with the sequence being 01111111111111111110. The information segment number 387 which follows each bit synchronization field 386 is a 10-bit RLL sequence that provides a segment identifier for information in the information segment field (ISF) 389 that follows. The information segment field has 30 bytes of 10 bits of information each. There are 48 unique information segment numbers 388, which correspond to the 48 data sub-blocks 386 in each physical data block 317.

In order to recognize a physical data block 317, and in particular a data area 352 in a physical data block 317, the pattern detector 143 is configured with comparator and sequencer circuitry to detect the synchronization field ("BSF", which has the value 01111111111111111110) and the forty eight RLL information segment numbers ("ISN"). In this respect, in monitoring in the stream of bits obtained from the read head R1, the pattern detector 143 looks for the first occurence of the BSF and, upon detecting the same, looks for the first ISN. Exactly thirty bytes later, the pattern detector 143 looks for the second occurence of the BSF and the second ISN. Similarly, another thirty bytes later the pattern detector 143 expects to see a third occurence of the BSF and the third ISN. The pattern detector 143 operates in this manner for 48 iterations corresponding to the 48 sub-blocks expected in a physical data block 317. Only after the detection of 48 BSFs with respective ISNs, and the proper 30 byte spacing between each BSF occurence, will the pattern detector 143 generate the BKRDY signal which indicates that a physical data block is ready.

However, the HEAD SYNC generator 164 ignores BKRDY signals generated for any physical data block 317 except the first physical data block recorded on a stripe. This is because the HEAD SYNC generator 164 knows the physical distance between the first physical data block 137 on a stripe and the end of the stripe.

In order to "filter" or "qualify" only BKRDY signals generated with respect to a first physical data block on a stripe, a timing qualifier window signal TIME QUAL (also known as "Q") is generated. In this respect, the timing of the TIME QUAL signal is related to the timing of the leading or rising edge of the HEAD SYNC signal. As described below and as represented by step 536 in FIG. 12, the TIME QUAL signal is generated to go high at 512 VCLOCK pulses after HEAD SYNC goes high, and to go low at 2048 VCLOCK pulses after HEAD SYNC goes high.

The edges of the TIME QUAL signal are generated by the counters 520 and 521 operating in conjunction with the AND gate 522. In this regard, upon receipt of the high-going HEAD SYNC pulse, both counters 520 and 521 begin to count VCLOCK pulses. The counters 520 and 521 are configured so that AND gate 522 produces a high TIME QUAL signal (also known as the HSCNT 1280 signal) for application to the state sequencer 506 between 512 and 2048 pulses of VCLOCK as counted by the counters 520 and 521. Since the format of each stripe is precisely known, generation of a first BKRDY signal for a first physical data block 317 on the stripe should occur within the TIME QUAL window after the leading edge of the HEAD SYNC signal.

As shown at step 538 in FIG. 12, the HEAD SYNC generator 164 looks for receipt of a BKRDY signal during the TIME QUAL window. Assuming that no BKRDY signal is received by the HEAD SYNC generator 164 during drum rotation R₁ of FIG. 13, the HEAD SYNC generator 164 continues to operate with default values (as indicated in FIG. 12 by the return to step 536). The further operation of the remainder of the HEAD SYNC generator 164 using default values is not described in detail herein, such operation being understood by analogy from the ensuing discussion wherein actual values are utlized.

FIG. 13 shows that the pattern detector 143 recognizes a first physical data block 317 on a stripe just before rotation $R_N$ of the drum 36 while the window TIME QUAL is high. At this point, a BKRDY signal is received by the HEAD SYNC generator 164 and the loop of steps 536 and 538 of FIG. 12 is terminated.

Upon receiving the BKRDY signal, the HEAD SYNC generator 164 knows the amount of time required for the head to traverse the remainder of the stripe. In particular, the time required to traverse the remainder of the stripe is stored in register 504 as constant "K". Constant "K" has a value of 5236 VCLOCK pulses, which is easily determined knowing the nominal head/tape speed and the format of the stripe.

Although knowing the amount of time required for the head to traverse the remainder of the stripe, knowledge of the constant "K" alone is not sufficient to precisely establishing the trailing edge of the HEAD SYNC signal. Therefore, the state sequencer 506 operates to enable determination of an interval "A" and a count "B" for use in establishing the trailing edge of the HEAD SYNC signal.

In the above regard, to establish a new falling edge of the HEAD SYNC signal, upon receipt of the BKRDY signal the state sequencer 506 generates a COUNT ENB signal until SYNC TRIG goes high. While the COUNT ENB signal is high, the up-counter 508 is enabled to count the number of VCLOCK pulses between the receipt of the BKRDY signal and the high-going edge of the SYNC TRIG signal.

When SYNC TRIG goes high, the state sequencer 506 loads the count of counter 508 into the register 510 by issuing a LO_STA_REG signal. The count of counter 508 is the interval value "A" corresponding to the number of VCLOCK pulses counted from the receipt of the BKRDY signal (i.e., the end of the first physical data block on the stripe) to the DRUM SYNC signal.

When SYNC TRIG goes high, the HEAD SYNC generator 164 knows not only the constant "K" required for the head to traverse the remainder of the stripe, but also how much of that time (interval "A") was expended prior to the DRUM SYNC signal. The HEAD SYNC generator 164 can therefore calculate the time "B" required, after receipt of the DRUM SYNC signal (i.e., after SYNC TRIG goes high) for the head to traverse the remainder of the stripe. In this regard, $B = K - A$. Thus, the HEAD SYNC generator 164 can establish the trailing or falling edge of the HEAD SYNC signal relative to the DRUM SYNC pulse.

The computational circuit 512 subtracts the interval "A" from the constant "K" to determine "B". The value for "B" is loaded into register 514. The down counter 516 counts down from "B" to zero. Upon reaching zero, the down counter 516 resets the flip-flop 517, thereby causing TRIG SYNC to go low. The low-going TRIG SYNC signal in turn resets flip-flop 518, causing HEAD SYNC to also go low. Thus, completing the operation signified by step 540 of FIG. 12, the trailing edge of HEAD SYNC is precisely established.

As indicated by step 542, with the trailing edge of HEAD SYNC precisely established with reference to the DRUM SYNC signal, the leading or rising edge of HEAD SYNC is easily established. In this respect, the pulse width of HEAD SYNC, a known constant "L" equal to the number of VCLOCK pulses (6144) for the drum 36 to rotate 180 degrees, is stored in register 502. When TRIG SYNC and HEAD SYNC go low, the low-going TRIG SYNC signal causes the down counter 519 to start counting down the 6144 VCLOCK pulses required for the drum 36 to rotate 180 degrees. When the down counter 519 reaches zero, the down counter 519 sets the flip-flop 518. Setting of flip-flop 518 causes HEAD SYNC to go high, meaning that the leading or rising edge of HEAD SYNC is established.

Precise location of the rising and falling edges of HEAD SYNC enable the helical scan system 30 to know exactly when write heads W1, W2 and read heads R1, R2 are over a stripe. As explained before, when HEAD SYNC is high, the read heads R1, R2 are over their respective stripes T1, T2 (i.e., are in a portion of the path of drum periphery travel that contacts the tape 32). Conversely, when HEAD SYNC is low, the write heads W1, W2 are over their respective stripes T1, T2.

The HEAD SYNC signal also enables the helical scan system 30 to know when the servo head S is over track T2 (step 544). As shown in FIG. 1, the servo head S is mounted on the drum 36 at an angular displacement of 90 degrees from the read heads R1, R2. This means that the servo head S traverses Track T2 90 degrees after read head R2 traverses Track T2. Accordingly, FIG. 13 shows a SERVO SYNC signal having the same pulse width as the HEAD SYNC signal, but being phase shifted by 90 degrees with respect to HEAD SYNC. That is, the leading edge of the SERVO SYNC signal occurs 90 degrees after the leading edge of the HEAD SYNC signal, and the trailing edge of the SERVO SYNC signal occurs 90 degrees after the trailing edge of the HEAD SYNC signal.

Once the edges of the HEAD SYNC signal are established in according with the foregoing, the transport speed of the tape 32 can be reduced to nominal so that the read heads R1, R2 can begin to read all subsequent stripes in their entireity. With the edges of the HEAD SYNC signal precisely established, the helical scan system knows exactly when the read heads R1, R2 begin to traverse their respective tracks T1, T2 and when the read heads R1, R2 finish traversing their respective tracks during a rotation of the drum 36.

For each rotation of the drum 36 and until the heads encounter End of Data records (step 546), the HEAD SYNC generator 164 re-establishes the leading and trailing edges of the HEAD SYNC signal. In this respect, for each rotation of the drum 36 the steps 538 through 546 of FIG. 12 are executed so that the most recent receipt of a first BKRDY signal per stripe can be used to update the locations of the edges of the HEAD SYNC signal.

With the tape speed at nominal and the read heads R1, R2 knowing when they begin to traverse their tracks, a servo adjust may be required to precisely center the heads over the centerlines of the stripes they follow. Even in this regard the accurately developed HEAD SYNC edges are important, as is explained in simultaneously-filed U.S. patent application Ser. No. 07/433977 entitled SERVO TRACKING FOR HELICAL SCAN RECORDER, which is incorporated herein by reference.

Thus, the HEAD SYNC signal is obtained by reading data provided in physical data blocks 317 recorded on helical stripes. The helical scan system 30 of the invention reads digital data before establishing its timing signals, rather than first establishing timing signals through the use of special synchronization bursts and then using the timing singals to lock on to data.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows 1. A method of developing a digital timing signal indicative of when a head of a helical scan recorder is positioned over a stripe of magnetic tape by a helical scan recorder, said helical scan recorder including a rotating drum carrying a head with magnetic tape being transported past said head, said method comprising:
    (a) transporting said tape past said drum;
    (b) rotating said drum with said head mounted thereon;
    (c) attempting to recognize, with said head, a pattern of digital data recorded on said magnetic tape and determining when said pattern of digital data has been recognized; and,
    (d) using the determination of when said pattern of digital data has been recognized to determine at least a first edge of said digital timing signal.

2. The method of claim 1, wherein said recognizable pattern of digital data comprises a set of pre-defined digital signals, and wherein recognizing said pattern involves recognizing a plurality of said sets of pre-defined digital signals with the sets having a predetermined spacing therebetween in an input digital data stream.

3. The method of claim 2, wherein said recognizable pattern of data indicates that a block of data on said stripe has been read.

4. The method of claim 1, wherein said step of determining first edge of said digital timing signal comprises generating a first edge of said digital timing signal at a constant interval K after said recognition of said digital data.

5. The method of claim 4, wherein said constant interval K after said recognition of said digital data is dependent upon the format of said stripe.

6. The method of claim 1, further comprising the step of determining a second edge of said digital timing signal at a constant interval L after said first edge of said digital timing signal.

7. The method of claim 6, wherein said constant interval L is related to the extent during a rotation of said drum that said head is positioned over said stripe.

8. The method of claim 1, wherein said pattern of digital data occurs a plurality of times on each of said stripes, and wherein said step of attempting to recognize said pattern involves locating a particular one occurrence of said pattern on any stripe.

9. The method of claim 8, wherein said particular one occurrence of said pattern is a first occurrence.

10. The method of claim 1, wherein said step of attempting to recognize said pattern is conducted only during a window interval Q after a preceding digital timing signal.

11. The method of claim 10, wherein upon initialization said digital timing signal is assigned a default position, and wherein said step of attempting to recognize said pattern is conducted only during a window interval Q after the default occurrence of said digital timing signal.

12. The method of claim 11, further comprising the step of generating a drum index signal with every rotation of said drum, and wherein said default position of said digital timing signal as initialized is established with relation to said drum index signal.

13. The method of claim 1, wherein recordation of said stripes on said tape occurred at a nominal speed of tape transport past said drum, and wherein in step (a) said tape is transported at a speed other than s id nominal speed.

14. The method of claim 1, wherein for each rotation of said drum said digital timing signal has a first edge which corresponds to the time at which said head ceases to traverse said stripe and a second edge which corrresponds to the time at which said head begins to traverse said stripe.

15. The method of claim 1, further comprising repeating steps (c) and (d) for each rotation of said drum.

16. The method of claim 1, further comprising the step of generating a servo timing signal corresponding to a time that a servo head should be positioned over said stripe, said servo timing signal being generated at a predetermined interval SS in relation to said digital timing signal.

17. The method of claim 16, wherein said predetermined interval SS is related to the relative position of said head and said servo head on said drum.

18. The method of claim 16, wherein said servo timing signal is a phase shift of s id digital timing signal.

19. A method of developing a digital timing signal for a helical scan recorder, said digital timing signal having a first edge which corresponds to the time at which said head ceases to traverse said stripe and a second edge which corrresponds to the time at which said head begins to traverse said stripe, said helical scan recorder including a rotating drum carrying a head with magnetic tape being transported past said head, and with the recordation of said stripes having occurred at a nominal speed of tape transport past said drum, said method comprising:
(a) transporting said tape past said drum at a speed other than said nominal speed;
(b) rotating said drum with said head mounted thereon;
(c) attempting to recognize, with said head, a pattern of digital data recorded on said magnetic tape and determining when said pattern of digital data has been recognized;
(d) determining a first edge of said digital timing signal at a constant interval K after said recognition of said digital data; and,
(e) determining a second edge of said digital timing signal at a constant interval L after said first edge of said digital timing signal.

20. The method of claim 19, wherein said recognizable pattern of digital data comprises a set of pre-defined digital signals, and wherein recognizing said pattern involves recognizing a plurality of said sets of pre-defined digital signals with the sets having a predetermined spacing therebetween in an input digital data stream.

21. The method of claim 20, wherein said recognizable pattern of data indicates that a block of data on said stripe has been read.

22. The method of claim 19, further comprising repeating steps (c), (d), and (e) for each rotation of said drum.

23. The method of claim 19, further comprising the step of generating a servo timing signal corresponding to a time that a servo head should be positioned over said stripe, said servo timing signal being generated at a predetermined interval SS in relation to s id digital timing signal.

24. A helical scan recorder which developes a digital timing signal indicative of when a head of the recorder is positioned over a stripe of magnetic tape, said helical scan recorder comprising:
a drum carrying a read head for reading stripes on said magnetic tape;
means for rotating said drum;
means for transporting said tape past said drum;
means connected to said read head for attempting to recognize a pattern of digital data recorded on said magnetic tape and for generating a recognition signal when said pattern of digital data has been recognized; and,
means responsive to said recognition signal for determining at least a first edge of said digital timing signal.

25. The apparatus of claim 24, wherein said recognizable pattern of digital data comprises a set of pre-defined digital signals, and wherein recognizing said pattern involves recognizing a plurality of said sets of pre-defined digital signals with the sets having a predetermined spacing therebetween in an input digital data stream.

26. The apparatus of claim 24, wherein said recognizable pattern of data indicates that a block of data on said stripe has been read.

27. The apparatus of claim 24, wherein said means for determining said first edge of said digital timing signal generates said first edge of said digital timing signal at a constant interval K after said recognition of said digital data.

28. The apparatus of claim 27, wherein said constant interval K after said recognition of said digital data is dependent upon the format of said stripe.

29. The apparatus of claim 24, further comprising means for generating a drum index signal with every rotation of said drum.

30. The apparatus of claim 29, wherein said means for determining said first edge of said digital timing signal comprises:
register means for storing a value corresponding to constant interval K related to the format of said stripe;
means for determining an interval A between the generation of said recognition signal and a subsequent drum index signal;
register means for storing a value corresponding to the interval A;
means for computing a difference between the values stored in said register means, said difference corresponding to an interval B; and,
means for using said difference value corresponding to interval B to generate said first edge of said digital timing signal.

31. The apparatus of claim 30, wherein said means for using the difference value corresponding to interval B to generate said first edge of said digital timing signal comprises a down counter.

32. The apparatus of claim 24, further comprising means for determining a second edge of said digital timing signal at a constant interval L after said first edge of said digital timing signal.

33. The apparatus of claim 32, wherein said constant interval L is related to the extent during a rotation of said drum that said head is positioned over said stripe.

34. The apparatus of claim 24, wherein said pattern of digital data occurs a plurality of times on each of said stripes, and wherein said means for attempting to recognize said pattern includes means for locating a particular one occurrence of said pattern on any stripe.

35. The apparatus of claim 34, wherein said particular one occurrence of said pattern is a first occurrence.

36. The apparatus of claim 34, wherein said means for locating a particular one occurence of said pattern on any stripe ignores any recognition signals not generated during a widow interval Q after a preceding digital timing signal.

37. The apparatus of claim 24, further comprising means for generating a servo timing signal corresponding to a time that a servo head should be positioned over said stripe, said servo timing signal being generated at a predetermined interval in relation to said digital timing signal.

38. The apparatus of claim 37, wherein said predetermined interval is related to the relative position of said head and said servo head on said drum.

39. The apparatus of claim 37, wherein said servo timing signal is a phase shift of said digital timing signal.

* * * * *